United States Patent [19]

May

[11] Patent Number: 5,143,160

[45] Date of Patent: Sep. 1, 1992

[54] CHAIN HARROW CARTS

[76] Inventor: R. Elwin May, R.R.#5, Belwood, Ontario, Canada, N0B 1J0

[21] Appl. No.: 673,789

[22] Filed: Mar. 22, 1991

[51] Int. Cl.$^5$ .................. A01B 35/02; A01B 63/14
[52] U.S. Cl. .................. 172/311; 172/612; 172/452; 172/457; 172/478
[58] Field of Search .......... 172/310, 311, 189, 322, 172/323, 452, 456–461, 466, 478–480, 488, 612, 684.5

[56] References Cited

U.S. PATENT DOCUMENTS

| | | |
|---|---|---|
| 304,737 | 9/1884 | Kirby. |
| 440,854 | 11/1890 | Travis. |
| 869,065 | 10/1907 | Datson. |
| 1,136,661 | 4/1915 | Evans. |
| 1,530,329 | 3/1925 | Roberts. |
| 1,594,085 | 7/1926 | Wills. |
| 2,599,084 | 6/1952 | Archer et al. ............ 172/311 |
| 2,599,251 | 6/1952 | Garrett. |
| 2,750,724 | 6/1956 | Stephenson. |
| 2,881,845 | 4/1959 | Aitkenhead ............ 172/612 |
| 2,963,098 | 12/1960 | Kesselring ............ 172/488 |
| 2,966,219 | 12/1960 | French. |
| 2,978,042 | 4/1961 | Jones ............ 172/323 |
| 3,021,908 | 2/1962 | Dlugosch. |
| 3,086,598 | 4/1963 | Gellner. |
| 3,091,296 | 5/1963 | Lohrman et al. ............ 172/456 |
| 3,154,151 | 10/1964 | Zimmer et al. ............ 172/456 |
| 3,376,050 | 4/1968 | Lohrman ............ 172/311 |
| 3,465,832 | 9/1969 | De Larm. |
| 3,613,801 | 10/1971 | Roth ............ 172/456 |
| 4,138,134 | 2/1979 | Lechler et al. ............ 172/311 |
| 4,505,338 | 3/1985 | Koval et al. ............ 172/612 |
| 4,582,142 | 4/1986 | Bridge ............ 172/34 |
| 4,813,489 | 3/1989 | Just et al. ............ 172/456 |
| 4,893,682 | 1/1990 | Smallacombe ............ 172/311 |

OTHER PUBLICATIONS

Farm Ind. News, Nov. 1990, "Harrowing ideas from Drills".
Noble, "800 Series Hydraulic Wheel Drawbars", Brochure, Sep. 1972.

Primary Examiner—Randolph A. Reese
Assistant Examiner—Spencer Warnick
Attorney, Agent, or Firm—Rogers & Scott

[57] ABSTRACT

A cart or "caddy" is provided for operation and transport of one or more chain harrows, the cart consisting of a frame running on a pair of road wheels. Different harrow mountings can be mounted on the frame, all of which include a draw bar to which the harrow is attached for operation. All of the mountings enable the draw bar to be lifted from the ground and then the body of the harrow to be engaged by one or more spaced cross bars parallel to the draw bar and over which the harrow is draped to store it and permit it to be transported on the cart out of contact with the ground. Some of the mountings are pivoted to the cart frame about an axis that in the stored position is vertical, so that the mounting and harrow can be turned longitudinally to reduce the effective width and permit the use of harrows that would otherwise be too wide to be moved over public roads. Wider arrangements use two harrows that operate side-by-side on mountings that are pivoted individually so that they can be turned to be parallel to one another in the stored transportable position; such mountings employ extra outrigger supporting wheels and tension cables to keep them parallel.

18 Claims, 12 Drawing Sheets

CHAIN HARROW CARTS

FIELD OF THE INVENTION

The invention provides new carts, sometimes also known as "caddies", for the operation, transport and storage of chain harrows.

REVIEW OF THE PRIOR ART

Chain harrows are widely used in agriculture to smooth ploughed fields, break up large lumps of soil and remove surface debris. One popular form of harrow is made up of a large number of interlinked elements, so that it is inherently flexible by relative pivoting at the link connections. The linked elements are hooked together to form a large flexible mat with downwardly protruding teeth or tines and is usually referred to in the industry as a chain harrow; it is quite usual to make such harrows double-sided with tines of different lengths on the two sides, so that the depth of working of the soil can be changed by turning the harrow over. The harrow is used by attaching it at one edge to a rigid transversely-extending draw bar, which is in turn attached to the tractor by which the harrow is pulled across the field.

Owing to their toothed structure these harrows must be handled with care when laying them flat in the field to put into operation, when storing them after a harrowing operation is finished, and when transporting them between the storage and operating locations; greater care must be taken in the case of a two-sided chain harrow with tines on both sides. The problem of course becomes more difficult as the harrow increases in size and they can measure about 2.5–5 meters (8–16 feet) in length and up to 10 meters (32 feet) in width.

DEFINITION OF THE INVENTION

It is an object of the invention therefore to provide a cart for a chain harrow.

It is a more specific object to provide such a cart that operates both as a draw bar for the harrow when in use, and as a storage means when it is not in use.

It is another specific object to provide such a cart that operates both as a draw bar and as means for transporting the harrow.

In accordance with the present invention there is provided a cart for a chain harrow comprising:

a cart frame;

a pair of cart wheels mounted by the cart frame for rotation about respective wheel axes and on which the cart runs;

a draw bar and at least one cross bar mounted on the cart frame to extend transversely thereof parallel to the wheel axes with the cross bar or bars ahead of the draw bar in the forward direction of operative movement of the cart;

the chain harrow being attachable to the draw bar along a respective edge thereof so as to be drawn along the ground in an operative position behind the cart frame as the cart moves forward;

draw bar and cross bar mounting means mounting the draw bar and each cross bar on the cart frame for lifting movement about respective transverse axes parallel to the wheel axes;

the draw bar being movable about its transverse axis to lift the attached edge of the harrow upward away from its operative position to a stored position; and each cross bar being movable about its transverse axis to engage the chain harrow at a location along its length spaced from the draw bar and an adjacent cross bar to support the chain harrow above the ground in its stored position.

DESCRIPTION OF THE DRAWINGS

Particular preferred embodiments of the invention will now be described, by way of example, with reference to the accompanying diagrammatic drawings wherein.

DESCRIPTION OF THE PREFERRED EMBODIMENTS

The same references will be used for similar parts of all the embodiments wherever that is possible. In some figures parts are shown broken away wherever that assists in clarifying the illustration.

Figure 1:
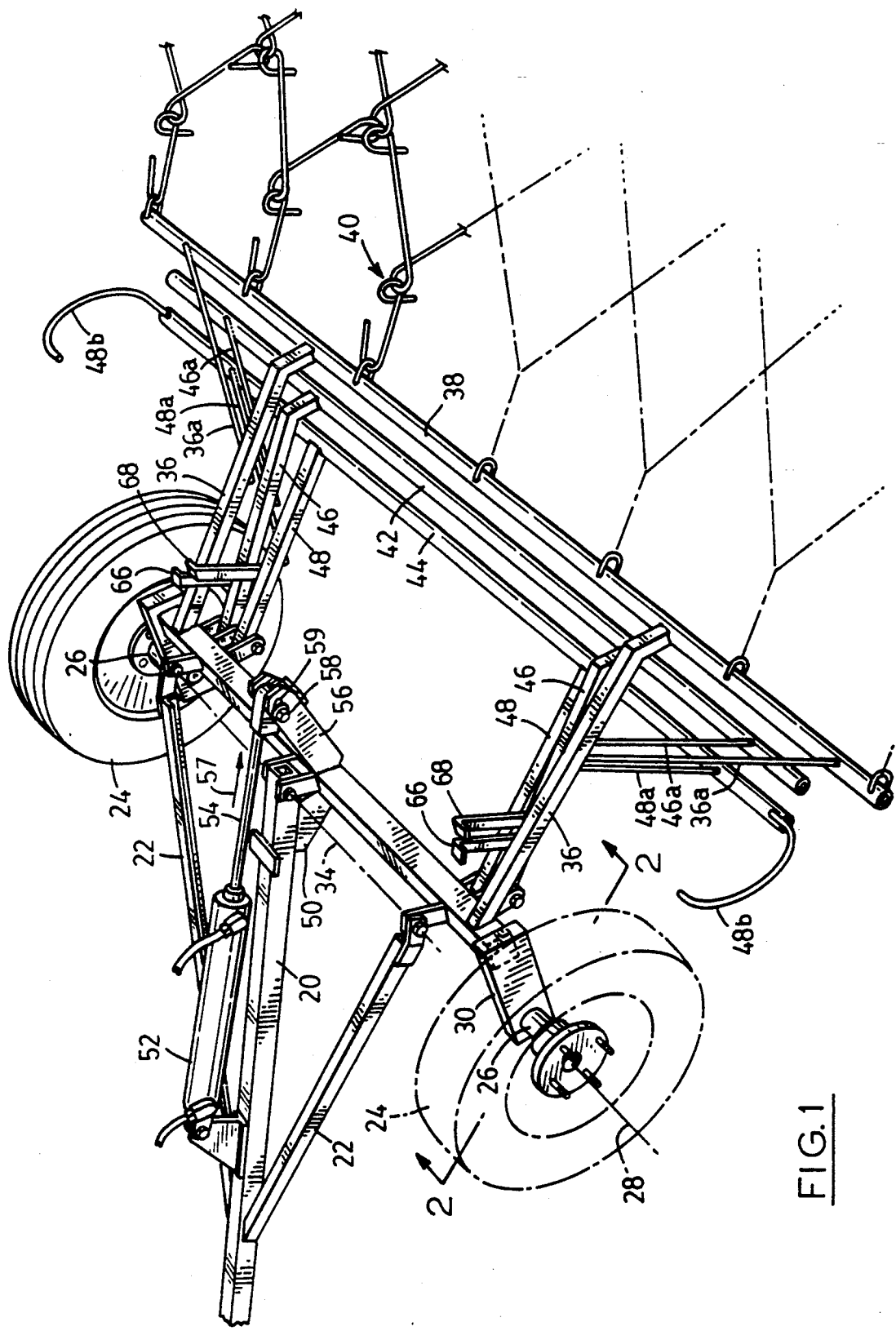
FIG. 1 is a perspective view from above and to one side of a first embodiment with the chain harrow and the harrow lifting and storing mechanism in operative position for harrowing.
Figure 2:
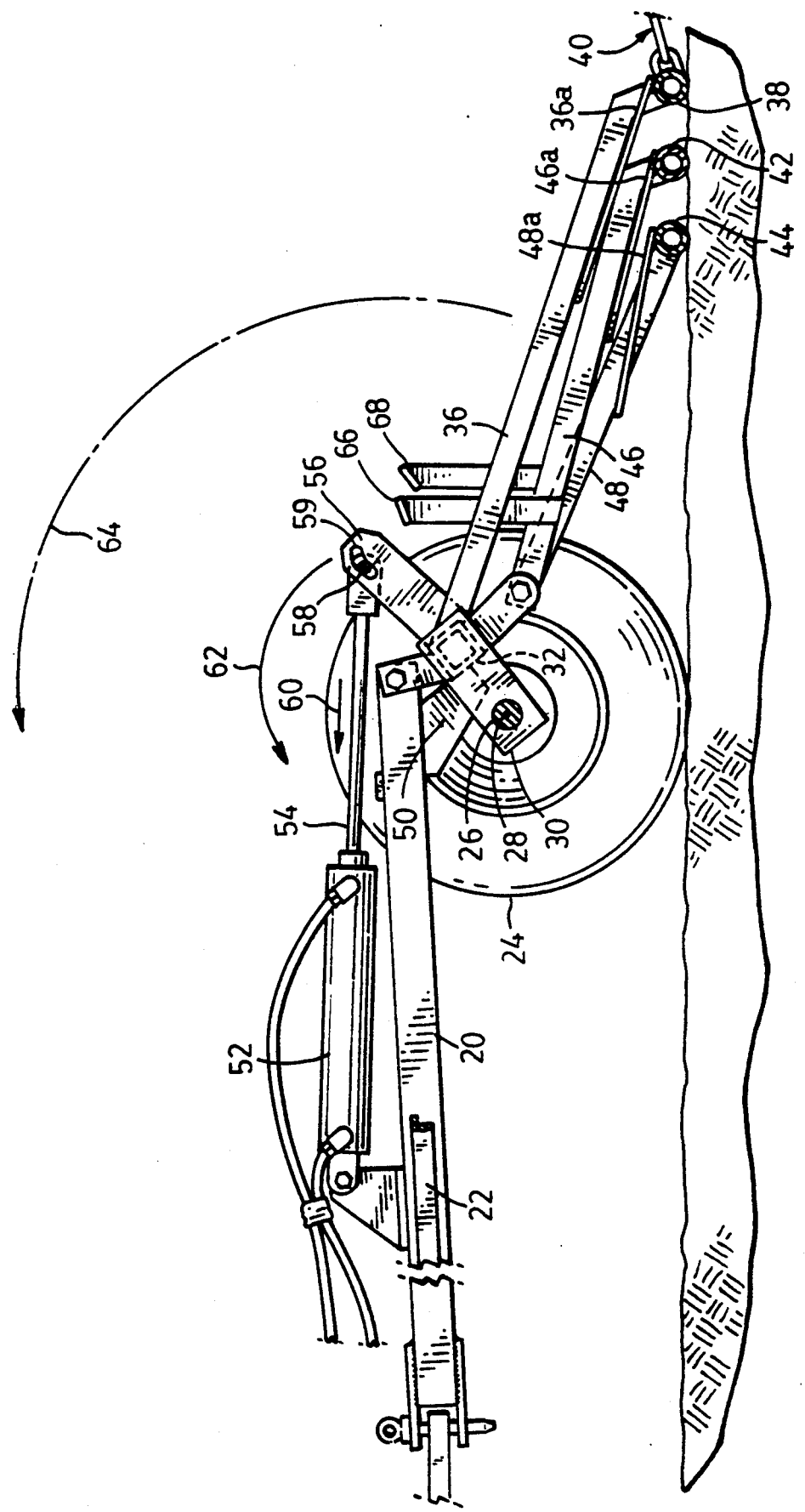
FIG. 2 is a section of the first embodiment taken on the line 2—2 of FIG. 1.
Figure 3:
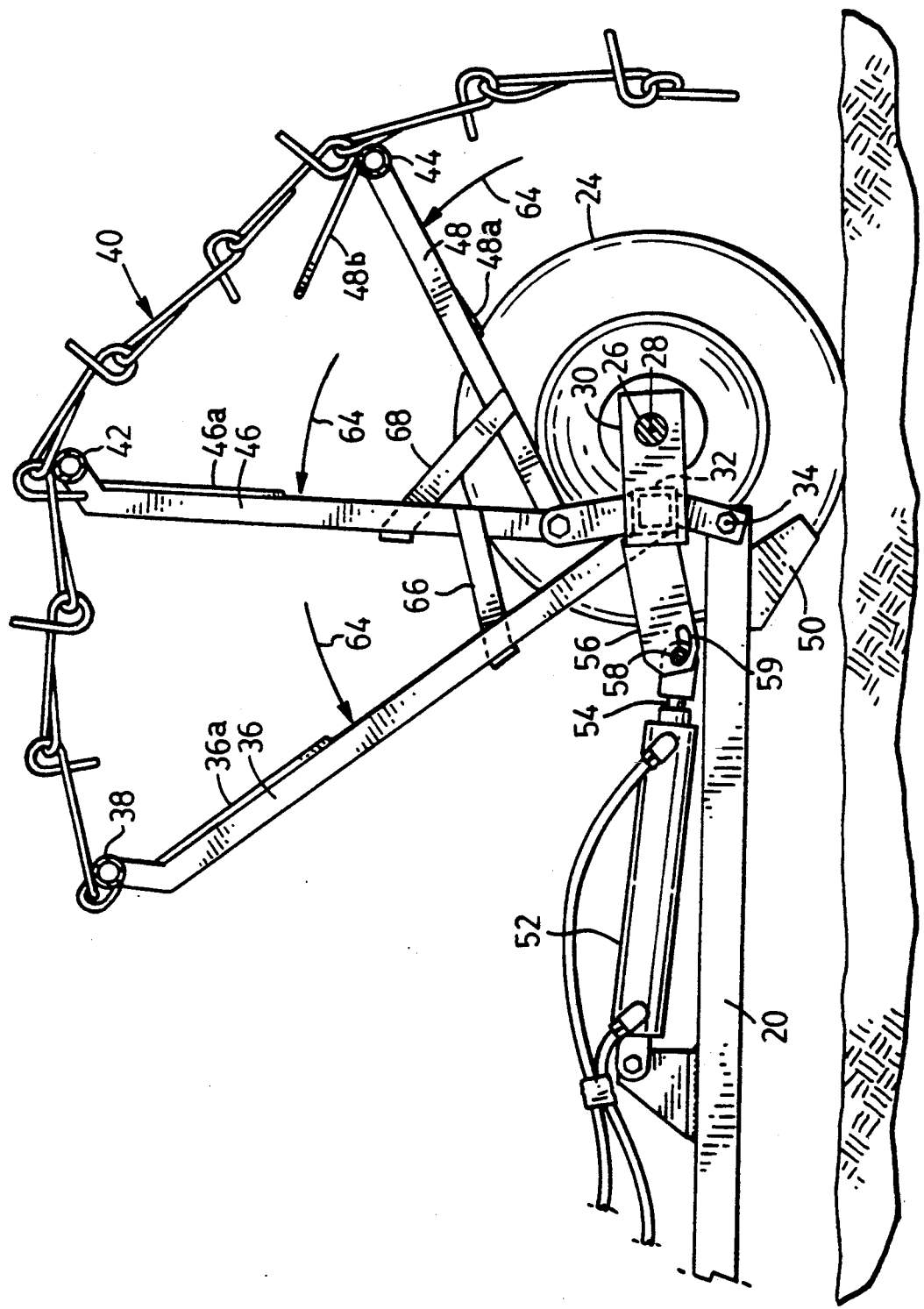
FIG. 3 is a section similar to that of FIG. 2, but with the lifting and storing mechanism and the harrow in the stored position for travelling.

The embodiment of FIGS. 1–3 is usable with chain harrows of from about 2.5 meters (8 feet) to about 5 meters (16 feet) in length, but is restricted to use with harrows that are not more than about 4 meters (12 feet) wide owing to the problems otherwise encountered in transporting a wide harrow along other than farm roads. The cart consists of a cart frame constituted by a central tongue member 20, one end of which as illustrated in FIG. 2 is adapted in any well known manner for attachment to the towing vehicle. The cart frame is also constituted by a pair of side members 22 attached to the tongue member and extending outwards therefrom to form the two equal inclined sides of an isosceles triangle. The cart runs on a pair of road wheels 24, each carried by a respective stub axle 26 to rotate about respective coaxial horizontal wheel axes 28. Each stub axle is carried by a leading support arm 30 rigidly attached to the respective end of a cross member 32 that is pivotally connected about a horizontal pivot axis 34 to the ends of the tongue and side members, so that the cross member can rotate from the operative position shown in FIGS. 1 and 2 to the stored position shown in FIG. 3.

Two transversely-spaced, rearwardly-extending draw bar support arms 36 are rigidly attached to the cross member 32 adjacent its ends, and a transversely extending draw bar 38 is rigidly attached to the rear ends of the arms 36 to extend parallel to the rotational axes 28 and 34, the draw bar having the leading edge of a chain harrow 40 attached thereto. For details of the construction of chain harrows particularly intended for use with the harrow carts of the invention reference may be made for example to U.S. Pat. Nos. 3,310,122 and 4,582,142, the disclosures of which are incorporated herein by this reference. This embodiment is also provided with two transversely-extending cross-bars 42 and 44 mounted on the cross-member 32, and thus mounted on the cart frame, by respective pairs of transversely-spaced, rearwardly-extending support arms 46 and 48. The lengths of the arms 36, 46 and 48 are progressively shorter so that the two cross-bars are disposed one in front of the other and in front of the drawbar 38 in the forward direction of movement of the cart. In the operative position of FIGS. 1 and 2 the draw-bar is at about ground level so that the harrow is in the proper attitude for harrowing as it is pulled over the ground.

The cross-bar 38, the two cross-bars 42 and 44 and their mounting means are held in this operative position by the action of motor means comprising a double-acting hydraulic cylinder 52 pivotally mounted on the tongue 20 and a cooperating piston, the piston rod 54 of which is pivotally connected to a lever arm 56 rigidly attached to the cross-member 32. The motor is supplied with oil under pressure in known controllable manner from the pump provided for this purpose on agricultural tractors. In the operative positon the motor urges the piston rod 54 in the direction of the arrow 57 (FIG. 1) until a stop 50 is engaged, this stop protecting the motor means against over-extension by the draw bar dropping too low, if it should encounter a ditch or a low spot in the ground. As is most clearly seen in FIGS. 2 and 3, the pivotal connection of the piston rod with the lever arm 56 employs a pin 58 moving in an arcuate slot 59 so as to accomodate the normal small up-and-down movements of the draw bar and the harrow as it moves over the field. If any larger bumps are encountered the motor acts as a hydraulic spring and damper to absorb any shocks thereby applied to the draw bar 38; at this time the two cross bars pivot freely and can move upward upon such encounters without transmission of any shocks to the cart frame.

Upon conclusion of the harrowing operation the operation of the hydraulic motor is reversed (arrow 60 in FIG. 2), whereupon the lever arm 56 moves anticlockwise as seen in the figures (arrow 60) about the axis 34, rotating the cross-member 32, lifting the draw bar (arrow 62), and thus lifting the leading edge of the harrow. After the draw bar has lifted through a predetermined angle a pair of latches 66 attached to the arms 46 are engaged by the draw bar arms 36, so that the arms 46 and their cross bar 42 also begin to lift; similarly when the arms 46 have lifted through a predetermined angle a pair of latches 68 attached to the arms 48 are engaged by the arms 46, so that the arms 48 and their cross bar 44 begin to lift. This action continues with each cross bar engaging the harrow at a respective location along its length spaced from the draw bar and also from the other cross-bar. This action continues until the mounting means reach the fully stored position illustrated by FIG. 3, in which the harrow is draped full length over the two cross-bars clear of the ground, whereupon the cart with harrow stored thereon can be towed to the next location for use or storage. The draw bar 38 and its arms 36 are provided with side guide struts 36a, and similarly the arms 46 and 48 are provided with respective side guide struts 46a and 48a; the second cross-bar 44 is in addition provided at its ends with freely-extending side guide members 44b. The purpose of these struts and members is to control side draft distortion of the harrow and to prevent rearward bending of the ends of the draw bar 38 and the intermediate supporting cross bars 42 and 44 during the harrowing operation. When the harrow is to be used it will be deposited from the stored position of FIG. 3 by reversing the operation of the hydraulic motor while the cart is moved slowly forward to lay the harrow flat on the ground.

It will be noted that in the stored position the effect of the rotation of the lever arm 56 and leading support arms 30 about the axis 34 is to reduce the height of the cart frame above the ground, so as to reduce the overall height of the cart with the stored harrow to ensure that it can for example pass through a standard barn door, while with the frame and harrow in the operative position the point of connection of the draw bar to the cart frame is at the correct height for good harrowing action.

An unexpected subsidiary advantage of the cart, when used with a double sided harrow such as that of U.S. Pat. No. 4,582,142, is its ability to turn the harrow over when this is required without any manual handling of the harrow. As described above, when the harrow is to be used it will be deposited from the stored position of FIG. 3 by reversing the operation of the hydraulic motor while the cart is moved slowly forward to lay the harrow flat on the ground. Reversal of the harrow is obtained by lifting its front edge a sufficient amount and then backing the cart until the harrow has been reversed; the draw bar is then uncoupled, the cart moved into the new position, and the harrow recoupled to the draw bar. An equivalent operation can be performed from the stored position if it is found that the harrow needs to be reversed from the attitude in which it has been stored.

Figure 4:
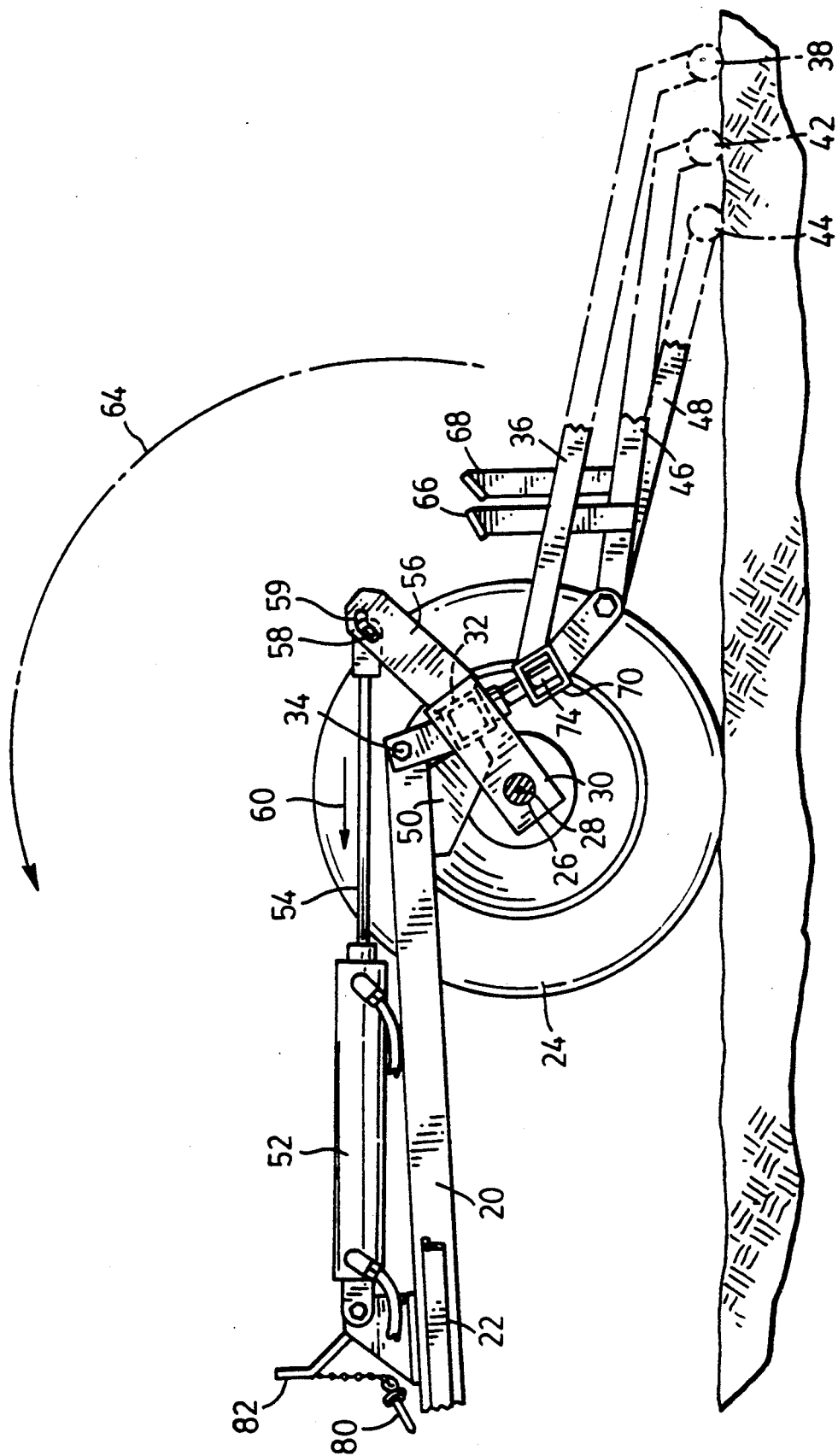
FIG. 4 is a section similar to that of FIG. 2 of a second embodiment with the lifting and storing mechanism in operative position.
Figure 5:
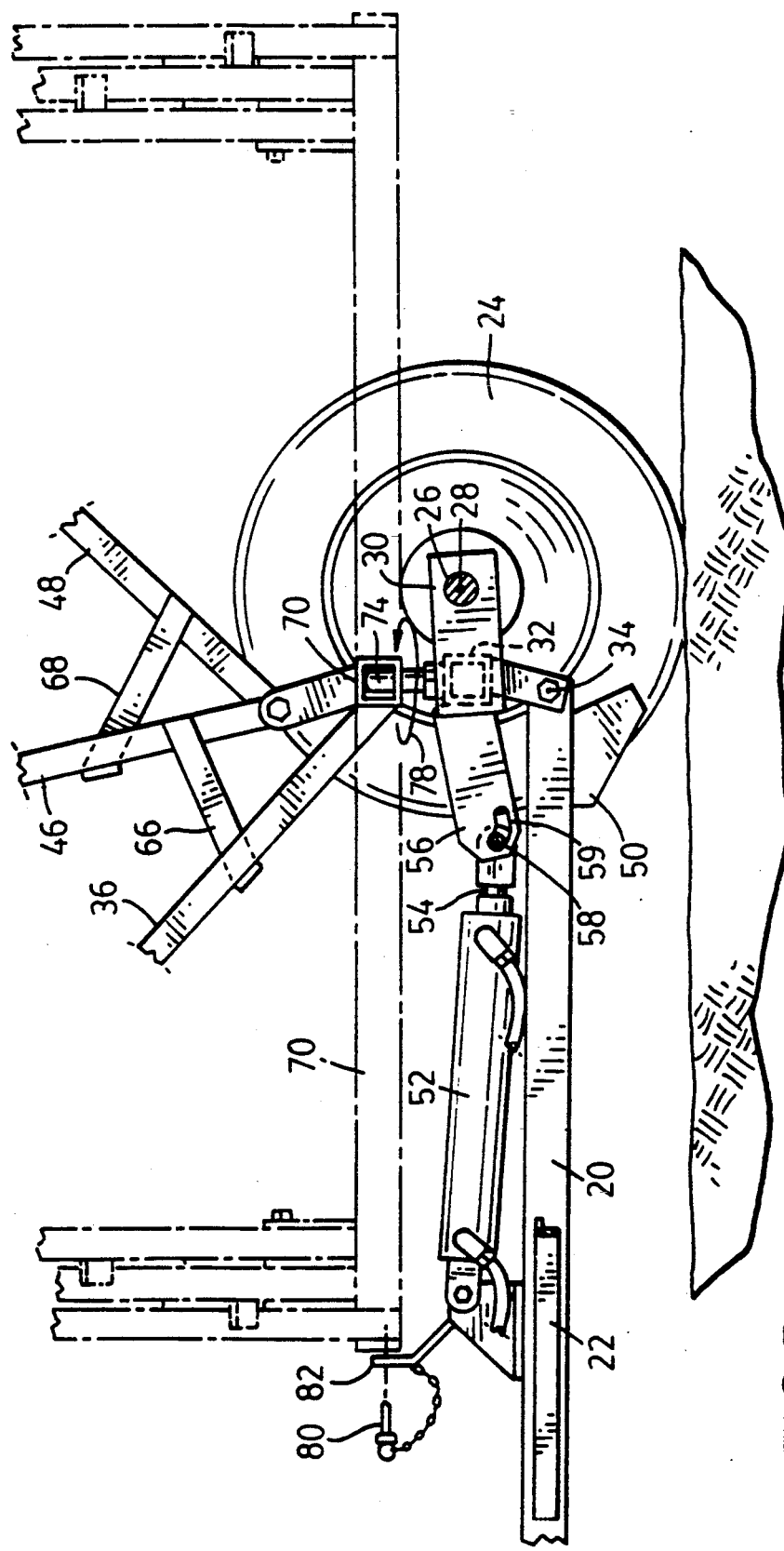
FIG. 5 is a section similar to FIG. 2 of the embodiment of FIG. 4 with the lifting and storing mechanism in the stored position.
Figure 6:
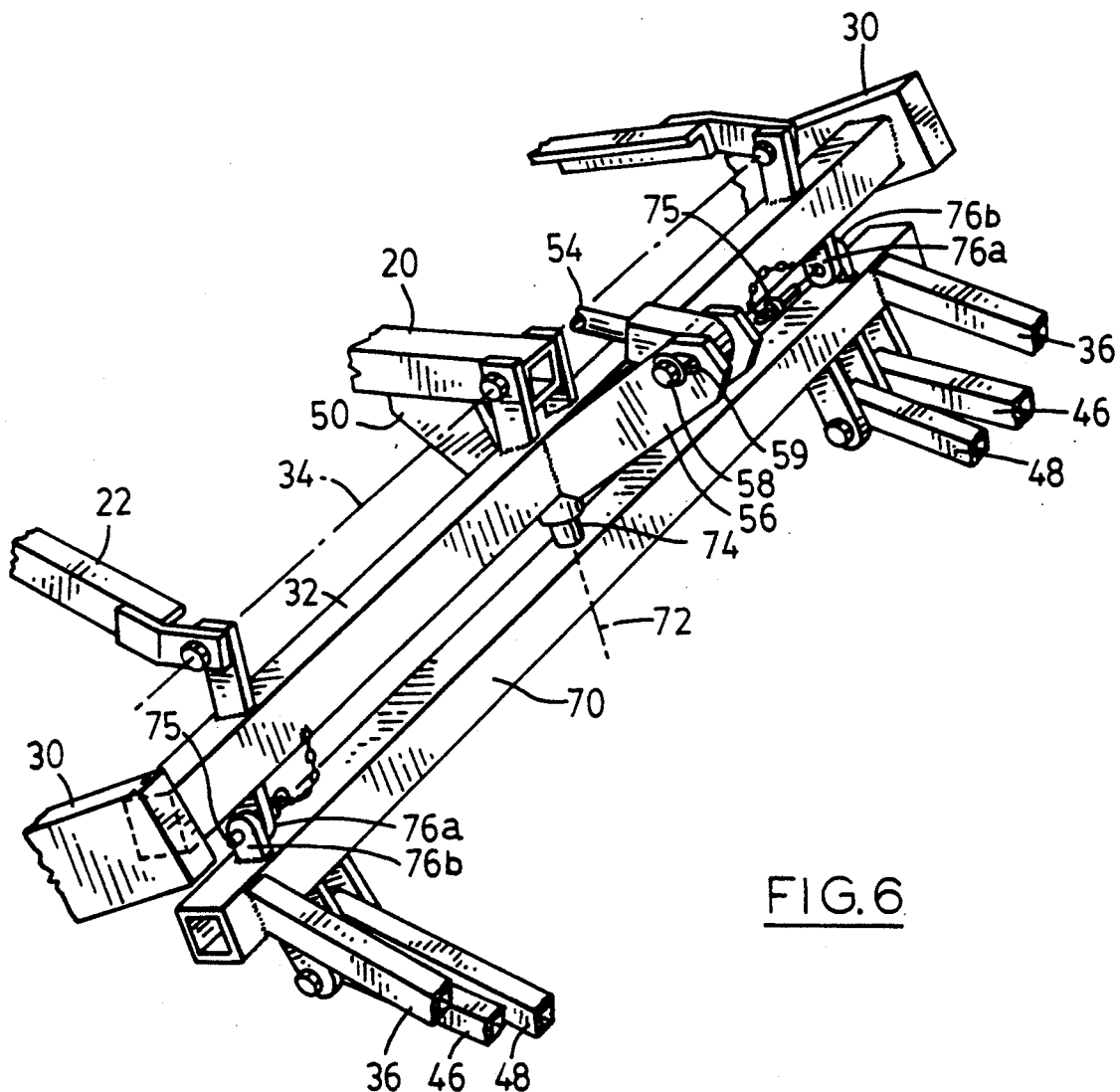
FIG. 6 is a perspective view of part of the lifting and storing mechanism of the embodiment of FIGS. 4 and 5 to show a detail of means for holding the mechanism in operative harrowing position.

FIGS. 4–6 together illustrate an embodiment in which the mounting means for the harrow are mounted on the cart frame to permit them, together with the harrow, to be moved from the operative position in which the harrow leading edge extends transversely of the cart frame to a stored position in which the harrow leading edge extends longitudinally of the cart frame, thus removing the limitation on the width of the harrow that it must not be wider than is permitted for movement on public roads without special precautions. In this embodiment the arms 36, 46 and 48 are mounted on a second cross member 70, instead of the cross member 32, and this second cross member is pivotally mounted on the cross member 32 for rotation about an auxiliary axis 72 by a centrally-disposed pivot rod 74 on the cross member 32 engaged in a cooperating bearing socket in the cross-member 70. With the mounting means in the operative position the two cross-members 32 and 70 are latched together by any suitable means, as shown for example in FIG. 6, such as by pins 75 engaged in respective pairs of cooperating lugs 76a and 76b provided respectively on the two cross-bars, so that they are held parallel to one another during the harrowing operation. With the mounting means raised to the position shown in solid lines in FIG. 5 the pivot auxiliary axis 72 is now vertical and the mounting means can readily be rotated (arrow 78) to the fully stored position shown in broken lines. The movable cross-member 70 is latched for transport in the longitudinal position relative to the cart frame 20 by any suitable means, as shown for example in FIG. 5, such as a pin 80 engaged in a strut 82 on the cart frame 20 and the adjacent end of the cross member 70.

Figure 7:
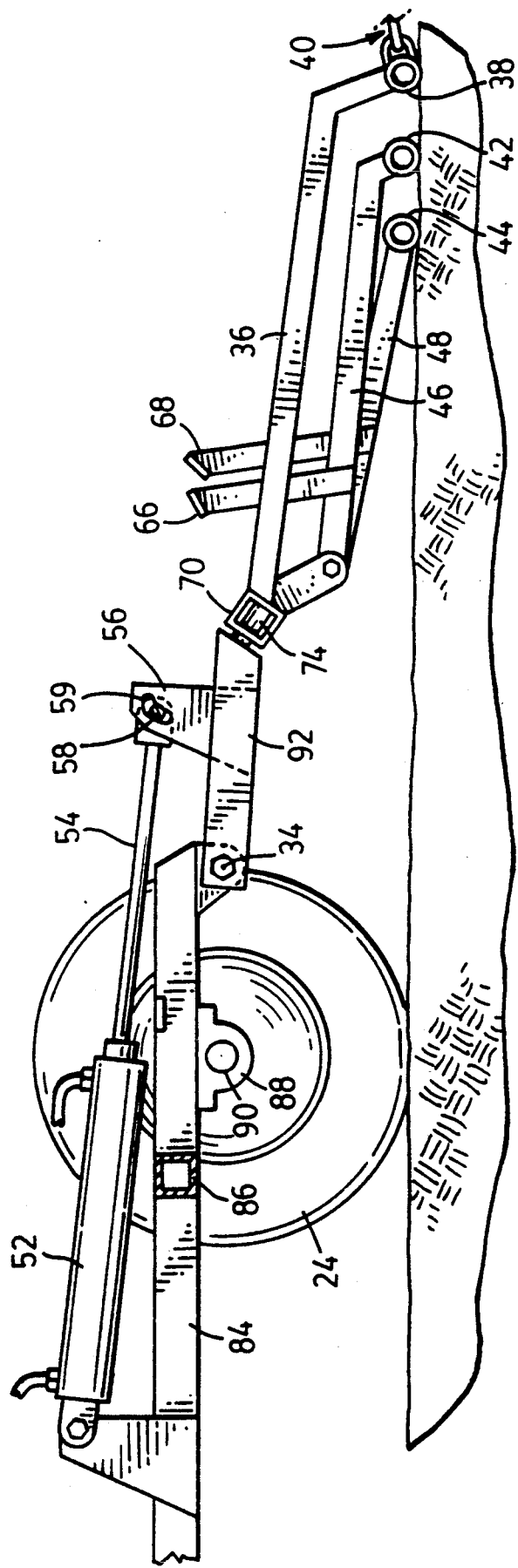
FIG. 7 is a longitudinal cross-section of a third embodiment employing two separate side-by-side lifting and storing mechanisms with the illustrated lifting and storing mechanism in operative position.
Figure 9:
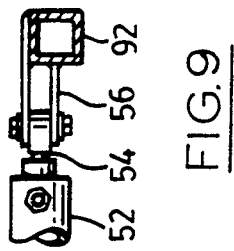
FIG. 9 is a cross-section of a detail taken on line 9—9 of FIG. 8.

A practical limitation is placed upon the width of the harrow that can be used with the embodiment of FIGS. 4–6 in that the second cross member 70 must be short enough to fit between the road wheels 24, and the ends of the draw and cross bars therefore overhang their support arms more and more as wider and wider harrows are used. This limitation is removed in the embodiment of FIGS. 7–12 in which the geometry of the cart frame is made such that the cross-member is always clear of the wheels. In addition the harrow is divided into two side-by-side portions and in this embodiment each is provided with its own lifting and storing means. The cart frame has two parallel side members 84 (see also FIGS. 11 and 13) connected by rigid transverse members 86, each side member carrying a bearing block 88 in which is mounted an axle 90 carrying the respective main road wheel 24. Each side member has a support arm 92 pivotally mounted at its rear end about horizontal pivot axis 34, this member being mechanically functionally equivalent to the cross-member 32 of the embodiment of FIGS. 4–6. Thus, each support arm is moved between the operative position of FIG. 7 and the partially stored position of FIG. 8 by a respective hydraulic motor means 52,54 connected at one end to the side member 84 and at the other end to lever arm 56 attached to support arm 92. Each support arm 92 has a respective cross member 70 pivotally mounted thereon, the pivot being offset along the length of the cross member so that it is divided into a shorter portion 70a and a longer portion 70b; in the operative position the two shorter portions are immediately adjacent to one another and the two cross members are aligned with one another.

Owing to the length of each portion 70b its outboard end is supported by a respective additional road wheel 94 mounted on a stub axle 96 and a link 98 rigidly attached to the cross member. The operative position of the two cross members 70 is shown in solid lines in FIG. 7 and broken lines in FIG. 10, while its raised semi-stored position is shown in solid lines in FIGS. 8 and 10; FIGS. 11 and 12 show one of the cross members in the fully stored position. Again owing to their length the outboard end of each member 70 is connected by a tension cable 100 to a forward part of the respective side frame member 84, the length of the cable being adjusted as required by a ratchet-controlled winch 102 so that the two cross-members can be held parallel to the wheel axes as the harrow is dragged forward.

Figure 8:
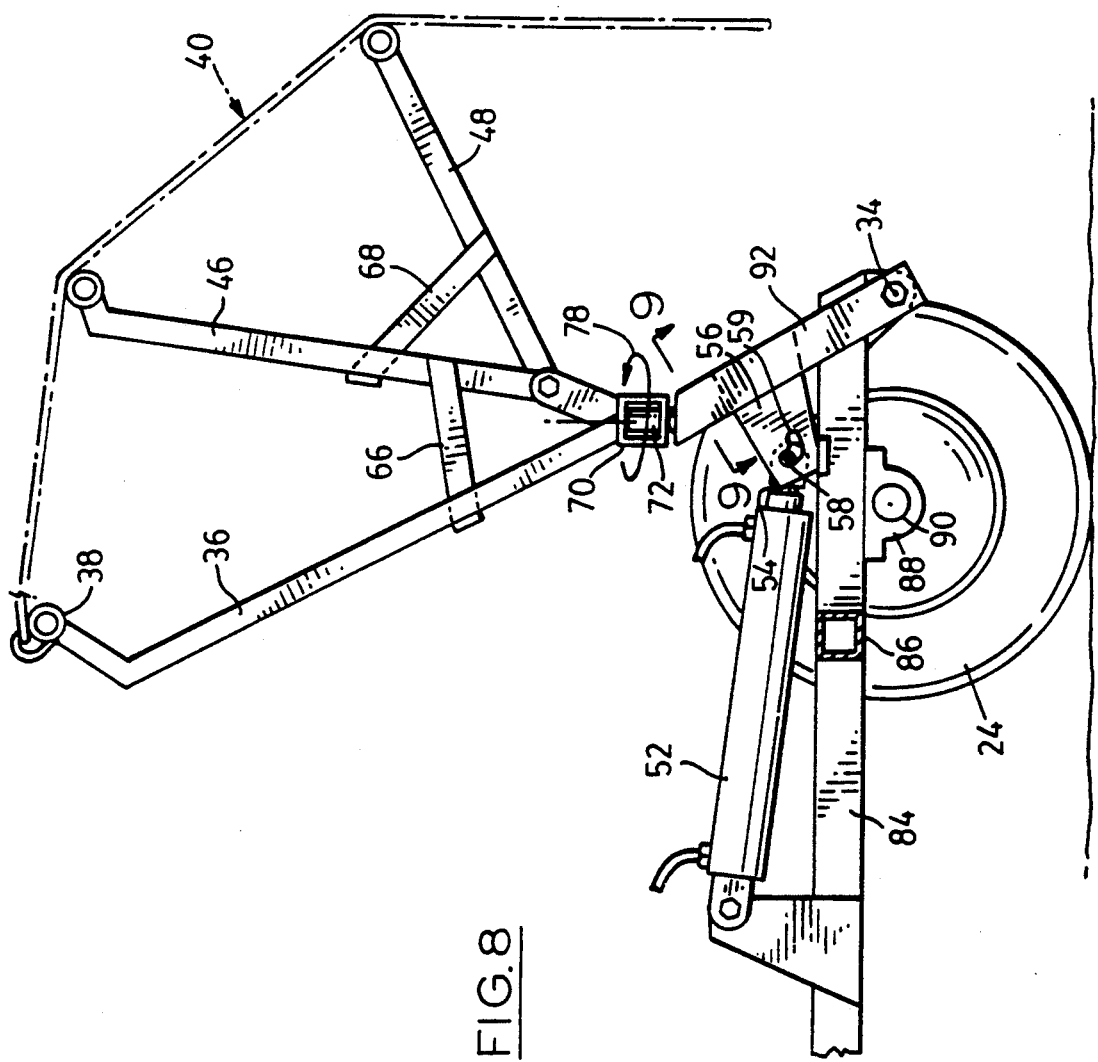
FIG. 8 is a section similar to FIG. 2 of the embodiment of FIG. 7 with the lifting and storing mechanism in its stored position.
Figure 10:
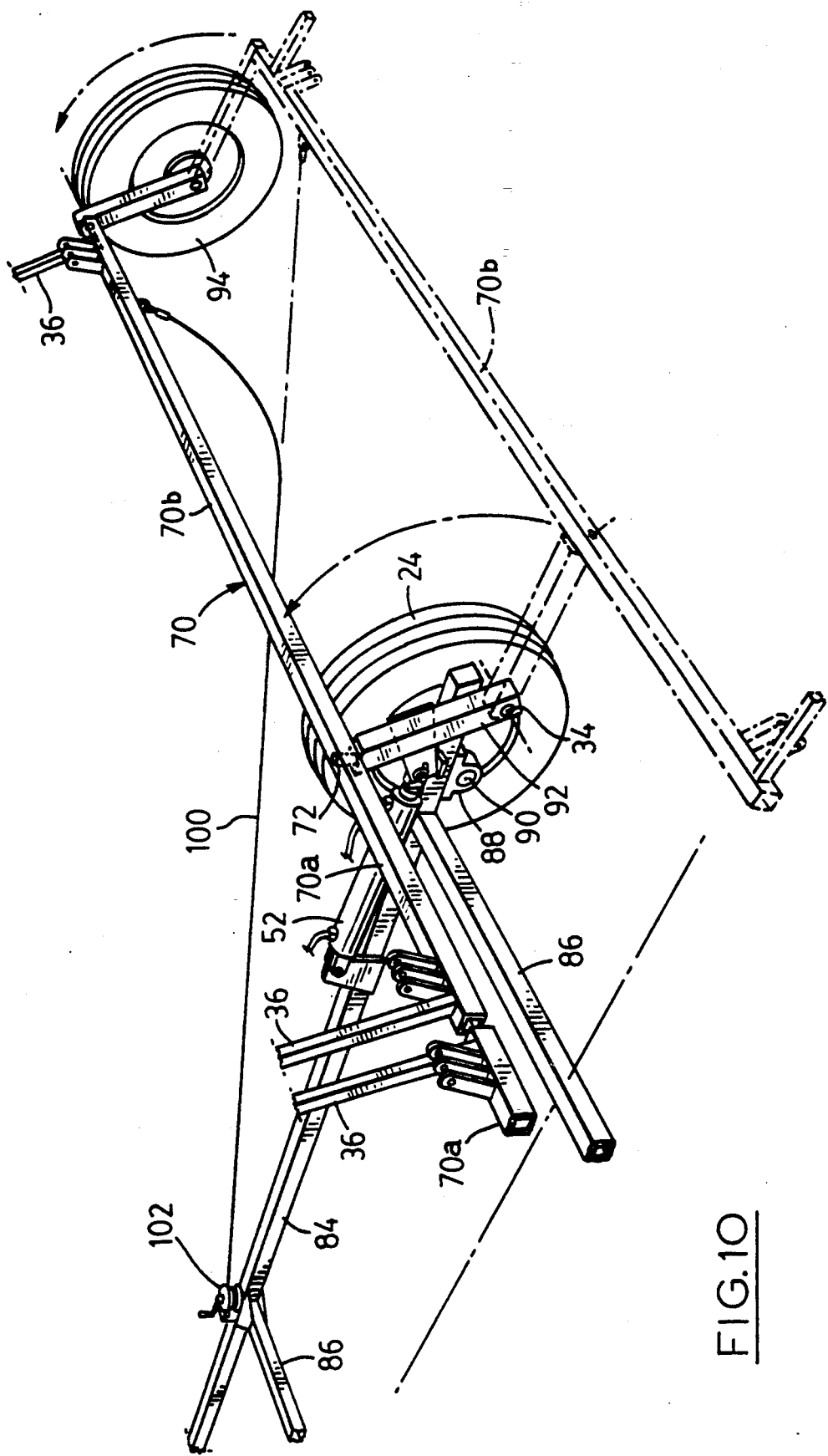
FIG. 10 is a part perspective view of one half of the third embodiment.
Figure 11:
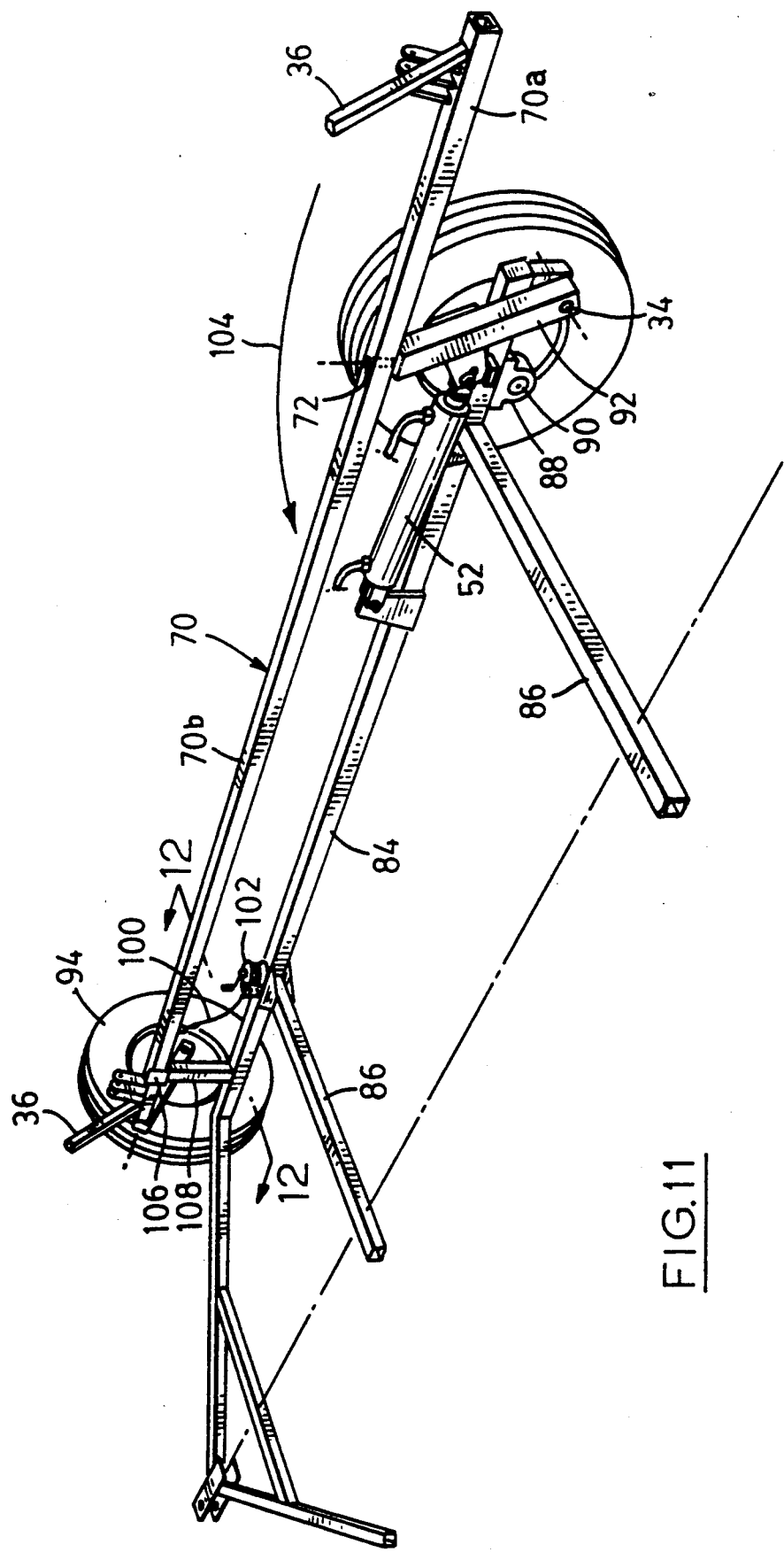
FIG. 11 is a part perspective view similar to FIG. 10 with the lifting and storing mechanism in the fully stored position.
Figure 12:
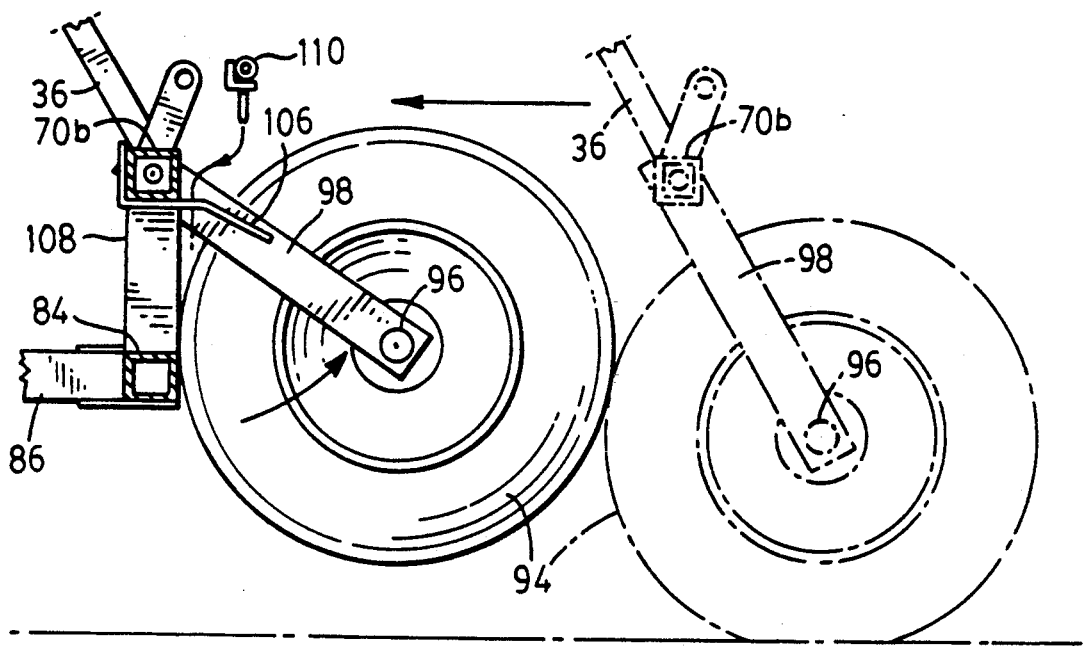
FIG. 12 is a cross-section taken on the line 12—12 of FIG. 11.

These cables and winches are also used when storing the two harrows in that, with the two separate harrow parts moved to the respective elevated semi-stored position of FIGS. 8 and 10, the winches 102 can now be operated to rotate the cross members 70 about their respective pivots to pull them (arrow 104) into the fully stored position in which they are in parallel alignment with their respective frame side member 84, as seen in FIGS. 11 and 12. Referring especially to FIG. 12, as each cross member approaches the fully stored position it engages a ramp 106 mounted on a strut 108 on the side member 84, the ramp lifting the end of the cross member and causing the wheel to lift so that the latter is clear of the ground for travel. The cross member is retained in this fully stored travel position by any suitable means such as a pin 110 that is inserted into the ramp behind the member. To return the harrows to the operative position the two wheels 94 are disengaged from their ramps and the cart moved forward with the winch ratchets released, when the sideways friction of the wheels on the ground will move them out to the position of FIG. 10, whereupon the motors 52, 54 can be operated while the cart is again moved forward until the two harrows are deposited flat and side-by-side on the ground.

Figure 13:
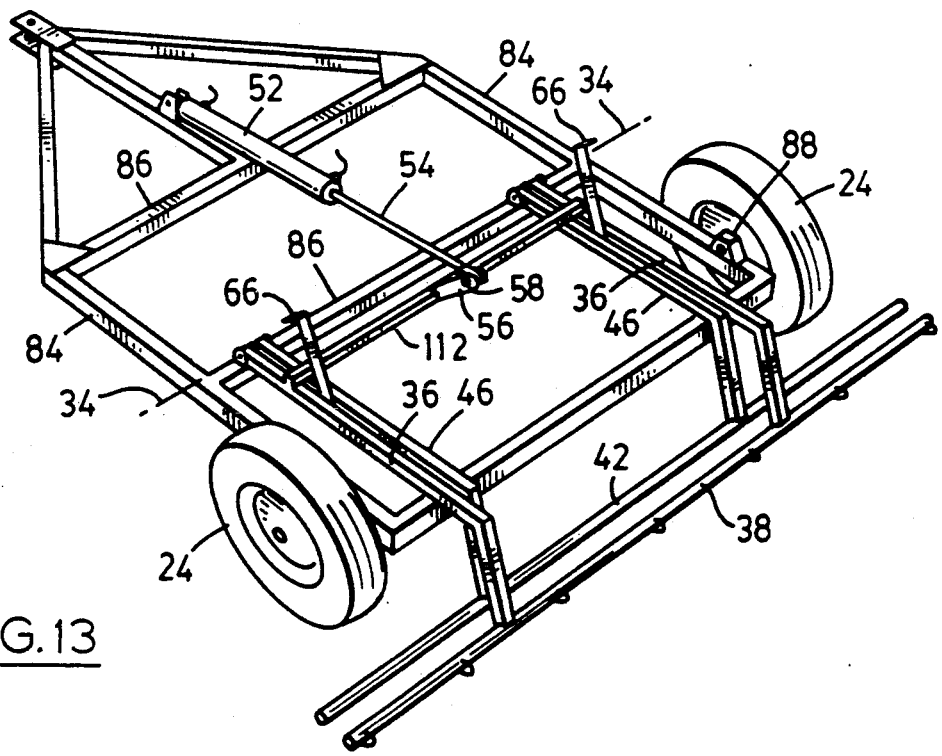
FIG. 13 is a perspective view of a fourth embodiment with the lifting and storing mechanism in the operative harrowing position.

FIG. 13 shows a simplified and relatively inexpensive embodiment, the frame having parallel side members 84 and rigid transverse members 86, the wheels 24 being mounted in respective bearing blocks 88 mounted on the side frames. The two arms 36 carrying the draw bar 38 are pivotally mounted directly on an intermediate transverse member 86 about the pivot axis 34; only a single cross-bar 42 is provided mounted on a shorter pair of arms 46 that are also pivoted about the axis 34. The motor cylinder 52 is pivotally attached to the forward part of the frame, while the piston 54 is pivotally connected to lever arm 56, this in turn being attached to a cross-bar member 112 connecting the two arms 36 for movement together. As with the previously-described embodiments the lifting of the arms 46 subsequent to the lifting of the arms 36 is obtained by latches 66 on the arms 46 that engage the arms 36 after they move beyond a predetermined angle.

Figure 14:
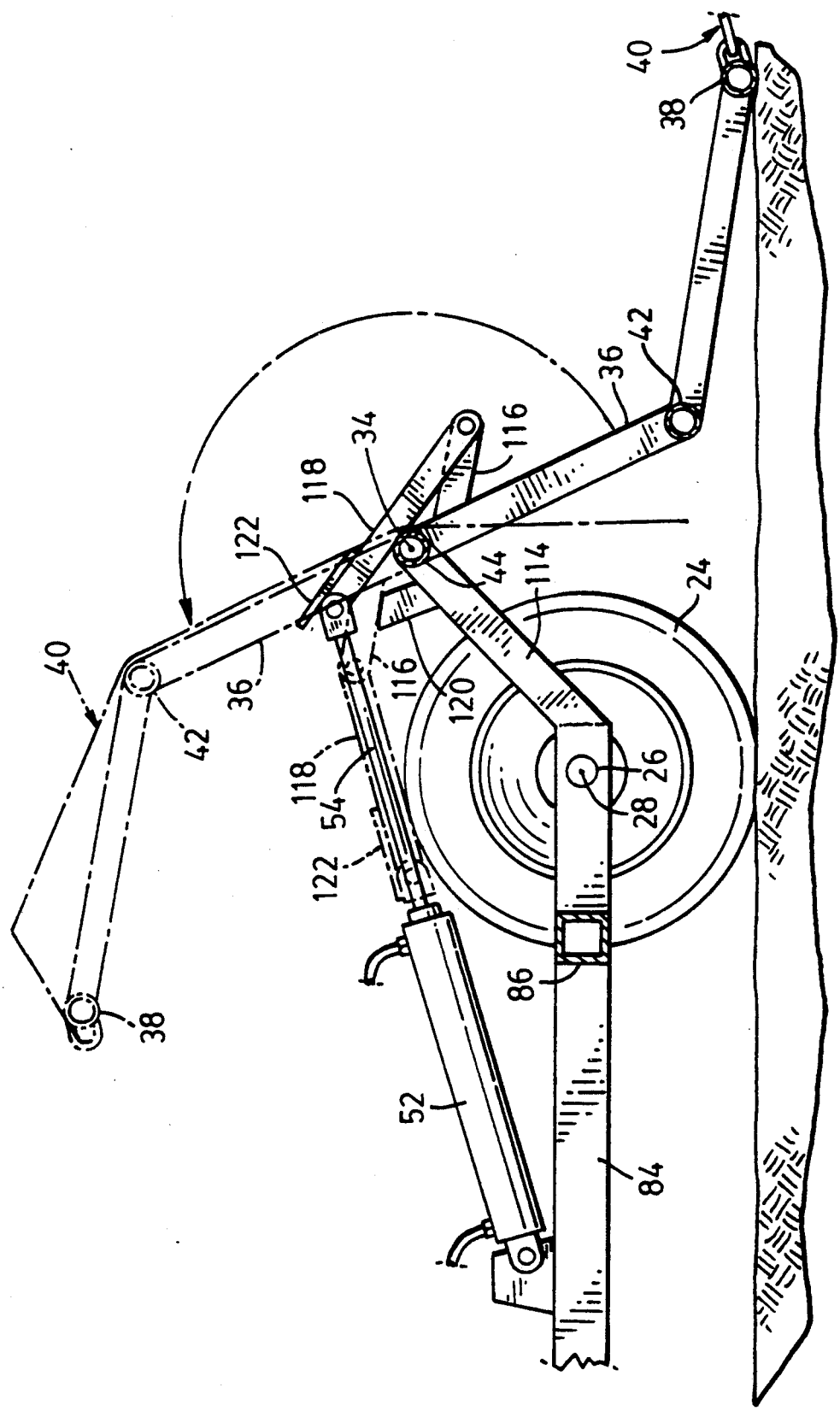
FIG. 14 is a section similar to FIG. 2 of a fifth embodiment, the lifting and storing mechanism being shown in operative harrowing position in solid lines and in stored position in chain broken lines.

FIG. 14 shows a another simplified and relatively inexpensive embodiment, the two parallel side frames 84 being provided at their rear ends with upwardly-extending end portions that terminate at the axis 32. The two arms 36 are cranked along their length so as to be concave upward in the operative position in order to obtain the correct draw angle, and so as to be convex upward in the stored position, so that the harrow will drape securely under gravity over the cross bar 42 in the stored position. The draw bar 38 is attached to the two free ends of the arms 36 and connects them for movement together, while the first cross bar 42 also extends between them and is rigidly attached to them at the crank junction; similarly the second cross bar 44 extends between them and is rigidly attached to them at the pivot axis 32. It will be seen that the respective axes of the draw bar and the first cross bar are coaxial with one another; the axis 32 and the longitudinal axis of the second cross bar 48 are also coaxial but the second cross bar is of course stationary and does not have a pivot axis. The arms 36 must be rotated through about 180° from the operative position shown in solid lines to the stored position shown in broken lines, and this motion is obtained by an over-centre linkage constituted by a first link 116 attached to the respective arm 36, and a second link 118 pivotally connected to the link 116 and to the end of the motor piston 54. The stored position of the linkage, and thus of the harrow storing means, is determined by a first stop member 120 attached to the end portion 114 and engaged by the link 116, and a second stop member 122 which prevents the link 118 from rotating over centre relative to the piston 54.

It will be seen therefore that I have provided a number of different transport carts operable with chain harrows of different sizes, all of which provide a draw bar suitable for attachment of the chain harrow thereto, and all of which enable the harrow to be moved to a stored position in which it is securely draped under gravity over at least one cross bar, which is thus suitable for transport without the need for the operator to physically handle the harrow. Although in all of the embodiments described a motor is used to move the mounting means and the harrow between operative and stored positions with at least the smaller embodiments it may be possible to hand move them, using mechanical latches to hold them in their respective positions.

I claim:

1. A cart for a chain harrow comprising:
   a cart frame;
   a pair of cart wheels mounted by the cart frame for rotation about respective wheel axes and on which the cart runs;
   a draw bar and at least one cross bar mounted on the cart frame to extend generally parallel to the wheel axes with the cross bar or bars ahead of the draw bar in the forward direction of operative movement of the cart;
   the chain harrow being attachable to the draw bar along a respective edge of said chain harrow so as to be drawn along the ground in an operative position behind the cart frame as the cart moves forward;
   draw bar and cross bar mounting means mounting the draw bar and each cross bar on the cart frame for lifting movement about respective draw bar and cross bar transverse pivot axes parallel to the wheel axes;
   the draw bar being movable about its draw bar transverse pivot axis to lift the attached edge of the harrow upward away from its operative position to a stored position; and
   each cross bar being movable about its respective cross bar transverse pivot axis to engage the chain harrow at a location along its length spaced from the draw bar and any adjacent cross bar to support the chain harrow above the ground in its stored position.

2. A cart as claimed in claim 1, wherein the draw bar and cross bar mounting means comprise a pair of transversely spaced draw bar arms for the draw bar and a respective pair of transversely spaced cross bar arms for each of the cross bars, each of which arms has first and second ends, the two arms of each pair being pivotally mounted at their respective first ends on the cart frame for movement about their respective draw bar or cross bar transverse pivot axis, each of the bars being attached to the second ends of its respective pair of arms.

3. A cart as claimed in claim 2, further comprising means for moving upwards the pair of cross bar arms of the cross bar that is immediately adjacent to the draw bar, said means for moving comprising a latch member on at least one of the last-mentioned cross bar arms engagable with a respective one of the draw bar arms upon a predetermined movement upwards of the cross bar arm to connect the cross bar and draw bar arms thereafter for movement upwards together.

4. A cart as claimed in claim 1, wherein the draw bar and cross bar mounting means are mounted on a frame cross-member of the cart frame for said lifting movement about the respective transverse pivot axes parallel to the wheel axes;
   the frame cross-member is mounted on the cart frame for pivotal movement about an auxiliary pivot axis that with the harrow in its operative position is disposed longitudinally of the cart frame, and that with the draw bar and cross bar mounting means in the stored position is disposed vertically, whereby in the stored position the frame cross-member, the draw bar and cross bar mounting means and the harrow mounted thereon can be turned about the now vertically disposed auxiliary pivot axis for the draw bar, the cross bar and the leading edge of the harrow to extend longitudinally of the cart frame to reduce the effective width of the cart and the harrow mounted thereon.

5. A cart as claimed in claim 5, wherein the draw bar and cross bar mounting means comprise a pair of transversely spaced draw bar arms for the draw bar and a respective pair of transversely spaced cross bar arms for each of the cross bars, each of which arms has first and second ends, the two arms of each pair being pivotally mounted at their respective first ends on the frame cross-member for movement about their respective draw bar or cross bar transverse pivot axis, each of the bars being attached to the second ends of its respective pair of arms.

6. A cart as claimed in claim 4, wherein the cart frame includes a first transverse member, the frame cross-member is mounted on the first transverse member for the pivotal movement about the auxiliary pivot axis, and wherein the frame cross-member is mounted by the first transverse member pibotal movement about a further horizontal transverse pivot axis, the last-mentioned pivotal movement of the frame cross-member about the further pivot axis providing the movement of the draw bar and cross bar mounting means and the harrow mounted thereon between the operative and the stored positions.

7. A cart as claimed in claim 6, wherein the draw bar and cross bar mounting means comprise a pair of transversely spaced draw bar arms for the draw bar and a respective pair of transversely spaced cross bar arm for each of the cross bars, each of which arms has first and second ends, the two arms of each pair being pivotally mounted at their respective first ends on the frame cross-member for movement about their respective draw bar or cross bar transverse pivot axis, each of the bars being attached to the second ends of its respective pair of arms.

8. A cart as claimed in claim 4, wherein there are provided two separate draw bar and cross bar mounting means, each mounted on a respective frame cross-member and each receiving a respective chain harrow for operation side by side when in operative position, each frame cross-member being mounted on the cart frame for pivotal movement about a respective auxiliary pivot axis, whereby both of the frame cross-members with their respective draw bar and cross bar mounting means can be turned for the harrow leading edges to extend longitudinally of the cart frame to reduce the effective width of the cart and the harrow mounted thereon.

9. A cart as claimed in claim 8, wherein each frame cross-member has its respective auxiliary pivot axis disposed closer to one end of the frame cross-member than the other end so that the frame cross-member comprises a shorter and a longer portion; and wherein the longer portion has mounted thereon an additional wheel supporting the longer portion for movement over the ground.

10. A cart as claimed in claim 9, and including for each frame cross-member a ramp means mounted on the cart frame and engaged by the end of the respective frame cross-member longer portion in the stored position to lift the additional wheel from the ground.

11. A cart as claimed in claim 9, and including a tension cable connected between the end of each frame cross-member longer portion and the cart frame forward of the frame cross-member, and means for adjusting the length of the cable to maintain the respective frame cross-member in operative position parallel to the cart wheel axes.

12. A cart as claimed in claim 1, and including at least two cross bars, wherein the draw bar and cross bar mounting means comprise for each of the cross bars a respective pair of transversely spaced cross bar arms, each arm having first and second ends and both arms of each pair being pivotally mounted at their respective first ends on the cart frame for movement about their respective transverse pivot axis, each of the cross bars being attached to the second ends of its respective pair of cross bar arms.

13. A cart as claimed in claim 4, and including at least two cross bars, wherein the draw bar and cross bar mounting means comprise for each of the cross bars a respective pair of transversely spaced cross bar arms, each arm having first and second ends and both arms of each pair being pivotally mounted at their respective first ends on the cart frame for movement about their respective transverse pivot axis, each of the cross bars being attached to the second ends of its respective pair of cross bar arms.

14. A cart as claimed in claim 6, and including at least two cross bars, wherein the draw bar and cross bar mounting means comprise for each of the cross bars a respective pair of transversely spaced cross bar arms, each arm having first and second ends and both arms of each pair being pivotally mounted at their respective first ends on the cart frame for movement about their respective transverse pivot axis, each of the cross bars being attached to the second ends of its respective pair of cross bar arms.

15. A cart as claimed in claim 5, further comprising means for moving upwards the pair of cross bar arms of the cross bar that is immediately adjacent to the draw bar, said means for moving comprising a latch member on at least one of the last-mentioned cross bar arms engagable with a respective one of the draw bar arms upon a predetermined movement upwards of the cross bar arm to connect the cross bar and draw bar arms thereafter for movement upwards together.

16. A cart as claimed in claim 7, further comprising means for moving upwards the pair of cross bar arms of the cross bar that is immediately adjacent to the draw bar, said means for moving comprising a latch member on at least one of the last-mentioned cross bar arms engagable with a respective one of the draw bar arms upon a predetermined movement upwards of the cross bar arm to connect the cross bar and draw bar arms thereafter for movement upwards together.

17. A cart for a chain harrow comprising:

a cart frame;

a pair of cart wheels mounted by the cart frame for rotation about respective wheel axes and on which the cart runs;

a draw bar and at least one cross bar mounted on the cart frame to extend generally parallel to the wheel axes with the cross bar or bars ahead of the draw bar in the forward direction of operative movement of the cart;

the chain harrow being attachable to the draw bar along a respective edge of said chain harrow so as to be drawn along the ground in an operative position behind the cart frame as the cart moves forward;

draw bar and cross bar mounting means mounting the draw bar and each cross bar on the cart frame for lifting movement about a horizontal pivot axis parallel to the wheel axes, the draw bar and cross bar mounting means comprising a pair of transversely spaced arms, each of which arms has first and second ends, the two arms being pivotally mounted at their respective first ends on the cart frame for movement about the pivot axis;

the draw bar being attached to the arms adjacent the respective second ends thereof so as to be movable about the horizontal pivot axis to lift the attached edge of the harrow upward away from its operative position to a stored position; and each cross bar being attached to the arms between the horizontal pivot axis and the draw bar so as to be movable about the horizontal pivot axis to engage the chain harrow at a location along its length spaced from the draw bar and any adjacent cross bar to support the chain harrow above the ground in its stored position.

18. A cart as claimed in claim 17, wherein the two arms are cranked along their length to have respective crank junctions intermediate their ends, so as to be concave upward in the operative position and convex upward in the stored position, and a cross bar is attached to the arms at the crank junctions.

* * * * *